(12) United States Patent
Atsumi et al.

(10) Patent No.: US 7,576,943 B2
(45) Date of Patent: Aug. 18, 2009

(54) MAGNETIC DISK DRIVE WITH POSITIONING CONTROL SYSTEM

(75) Inventors: Takenori Atsumi, Ibaraki (JP); Atsushi Okuyama, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 150 days.

(21) Appl. No.: 11/709,979

(22) Filed: Feb. 22, 2007

(65) Prior Publication Data

US 2007/0211371 A1    Sep. 13, 2007

(30) Foreign Application Priority Data

Mar. 9, 2006    (JP)    ............... 2006-063745

(51) Int. Cl.
*G11B 5/55*    (2006.01)
(52) U.S. Cl. .................................. 360/78.04
(58) Field of Classification Search .................. None
See application file for complete search history.

(56) References Cited

U.S. PATENT DOCUMENTS

| | | | |
|---|---|---|---|
| 5,608,586 A | 3/1997 | Sri-Jayantha et al. | |
| 5,774,299 A * | 6/1998 | Baum et al. .............. | 360/77.02 |
| 5,867,342 A * | 2/1999 | Hattori .................... | 360/77.08 |
| 6,014,285 A * | 1/2000 | Okamura ................. | 360/78.04 |
| 6,377,418 B1 * | 4/2002 | Kagami et al. ........... | 360/75 |
| 6,549,349 B2 * | 4/2003 | Sri-Jayantha et al. ..... | 360/75 |
| 6,690,534 B2 * | 2/2004 | Ding et al. .............. | 360/77.02 |
| 6,690,537 B2 * | 2/2004 | Kagami et al. .......... | 360/78.04 |
| 6,693,764 B1 * | 2/2004 | Sheh et al. .............. | 360/77.08 |
| 6,771,455 B1 * | 8/2004 | Yatsu ...................... | 360/75 |
| 6,914,743 B1 * | 7/2005 | Narayana et al. ......... | 360/77.02 |
| 6,937,428 B2 * | 8/2005 | Ho et al. ................. | 360/75 |
| 7,016,141 B2 * | 3/2006 | Bahirat et al. ........... | 360/77.02 |
| 7,035,037 B2 * | 4/2006 | Tao et al. ................ | 360/78.04 |
| 7,054,094 B2 * | 5/2006 | Zhang et al. ............ | 360/77.02 |
| 7,265,934 B2 * | 9/2007 | Takaishi ................. | 360/77.04 |
| 7,268,968 B2 * | 9/2007 | Semba et al. ............ | 360/78.04 |
| 7,372,659 B2 * | 5/2008 | Takaishi ................. | 360/77.04 |

OTHER PUBLICATIONS

Onuki et al., "Compensation for repeatable tracking errors in hard drives usingdiscrete-time repetitive controllers," *IEEE/ASME Transactions on Mechatronics*, (Jun. 2001), vol. 6, No. 2, pp. 132-136.

* cited by examiner

*Primary Examiner*—William J Klimowicz
*Assistant Examiner*—James L Habermehl
(74) *Attorney, Agent, or Firm*—Townsend and Townsend and Crew LLP; Patrick Duncan

(57) ABSTRACT

Embodiments in accordance with the present invention relate to a positioning control system of a magnetic disk drive. Even if there is no phase correlation in a specific vibration component before and after a seek operation of a magnetic head, a resonance filter in accordance with an embodiment of the present invention follows the vibration at the frequency at high speed. A frequency showing a periodic disturbance is selected as a target frequency Ft[Hz]. A resonance filter showing a peak gain at a frequency Ft is designed. For an input to the resonance filter, a time-variable gain K(t) is used that varies depending on the time lapsed after the completion of a seek operation. This time-variable gain K(t) takes a value larger than 1 when the resonance filter starts operating, and after the lapse of a fixed length of time, the value becomes 1 by degrees.

12 Claims, 7 Drawing Sheets

MAGNETIC DISK DRIVE WITH POSITIONING CONTROL SYSTEM

CROSS-REFERENCE TO RELATED APPLICATION

The instant nonprovisional patent application claims priority to Japanese Patent Application 2006-063745, filed Mar. 9, 2006 and incorporated by reference in its entirety herein for all purposes.

BACKGROUND OF THE INVENTION

In a magnetic disk drive such as an external storage device of a computer, a magnetic head follows any target track on a rotating magnetic disk surface, and data is recorded on the track for reproduction. This requires a control application to make the magnetic head lie on the target track accurately. Recently, there are tendencies to reduce the track width for the purpose of increasing the storage capacity of the magnetic disk drive, thereby requiring to increase, to a further degree, the accuracy and speed for positioning.

The reasons of causing the reduction of the positioning accuracy include the vibration of a position signal that is synchronous with the rotation of the disk, and the vibration of a mechanism system. These vibrations are observed in a specific frequency being an integral multiple of the rotation frequency of the disk, a natural frequency of the mechanism system, or others. For such vibrations, it is considered effective to design a control system using a digital filter (resonance filter) having a resonance point at the frequency. Such a resonance filter does not perform a calculation operation during a seek operation for the aim of preventing a transient response from occurring, and the resonance filter starts operation after a head reaches close to a target track. It thus takes time to suppress any disturbance after the head reaches close to the target track.

As a technology for addressing this issue, U.S. Pat. No. 5,608,586 describes a technique of making a resonance filter follow, at high speed, any vibration at a specific frequency with no transient response. This previous technology applies a method in which the resonance filter is operated for continuous calculations during a seek operation with an input of 0 to the resonance filter, and the resonance characteristics implemented by the resonance filter are left for free vibration. The reference "Compensation for Repeatable Tracking Errors in Hard Drives Using Discrete-Time Repetitive Controllers" IEEE/ASME TRANSACTIONS ON MECHATRONICS, VOL. 6, NO. 2, JUNE 2001, p. 132-136) describes a method of repeatedly increasing the learning speed of a control system. With this previous technology, for any vibration synchronous with the rotation, two types of filters are switched from one to the other to shorten the learning time.

As described in U.S. Pat. No. 5,608,586, with such a technique of setting 0 to an input for the resonance filter during a seek operation, an internal variable of the resonance filter is required to follow the vibration characteristics before the seek operation. Therefore, when the vibration characteristics with any target frequency show a gain difference or a phase difference before and after the seek operation, the positioning accuracy may be reduced. Especially with a seek operation attended with a head change, a long-distance seek operation, or a periodic disturbance at high frequencies, vibration components before and after the seek operation may have no correlation. In this sense, under such requirements, this technique is difficult for application use.

With the method of "Compensation for Repeatable Tracking Errors in Hard Drives Using Discrete-Time Repetitive Controllers" IEEE/ASME TRANSACTIONS ON MECHATRONICS, VOL. 6, NO. 2, June 2001, p. 132-136, because every vibration component synchronous with the rotation is subjected to learning, there is a problem of being difficult to shorten the learning time only for a specific frequency. With the actual magnetic disk drive, vibration synchronous with the rotation is not generated uniformly but mainly at a specific frequency. In this sense, the application limitation to a specific frequency is a great restriction.

BRIEF SUMMARY OF THE INVENTION

Embodiments in accordance with the present invention relate to a positioning control system of a magnetic disk drive. Even if there is no phase correlation in a specific vibration component before and after a seek operation of a magnetic head, a resonance filter in accordance with an embodiment of the present invention is made to follow the vibration at the frequency at high speed. A frequency showing a periodic disturbance is selected as a target frequency Ft[Hz]. A resonance filter showing a peak gain at a frequency Ft is designed. For an input to the resonance filter, a time-variable gain K(t) is used that varies depending on the time lapsed after the completion of a seek operation. This time-variable gain K(t) takes a value larger than 1 when the resonance filter starts operating, and after the lapse of a fixed length of time, the value becomes 1 by degrees.

For a more complete understanding of the present invention, reference is made to the following detailed description taken in conjunction with the accompanying drawings.

DETAILED DESCRIPTION OF THE INVENTION

Figure 1:
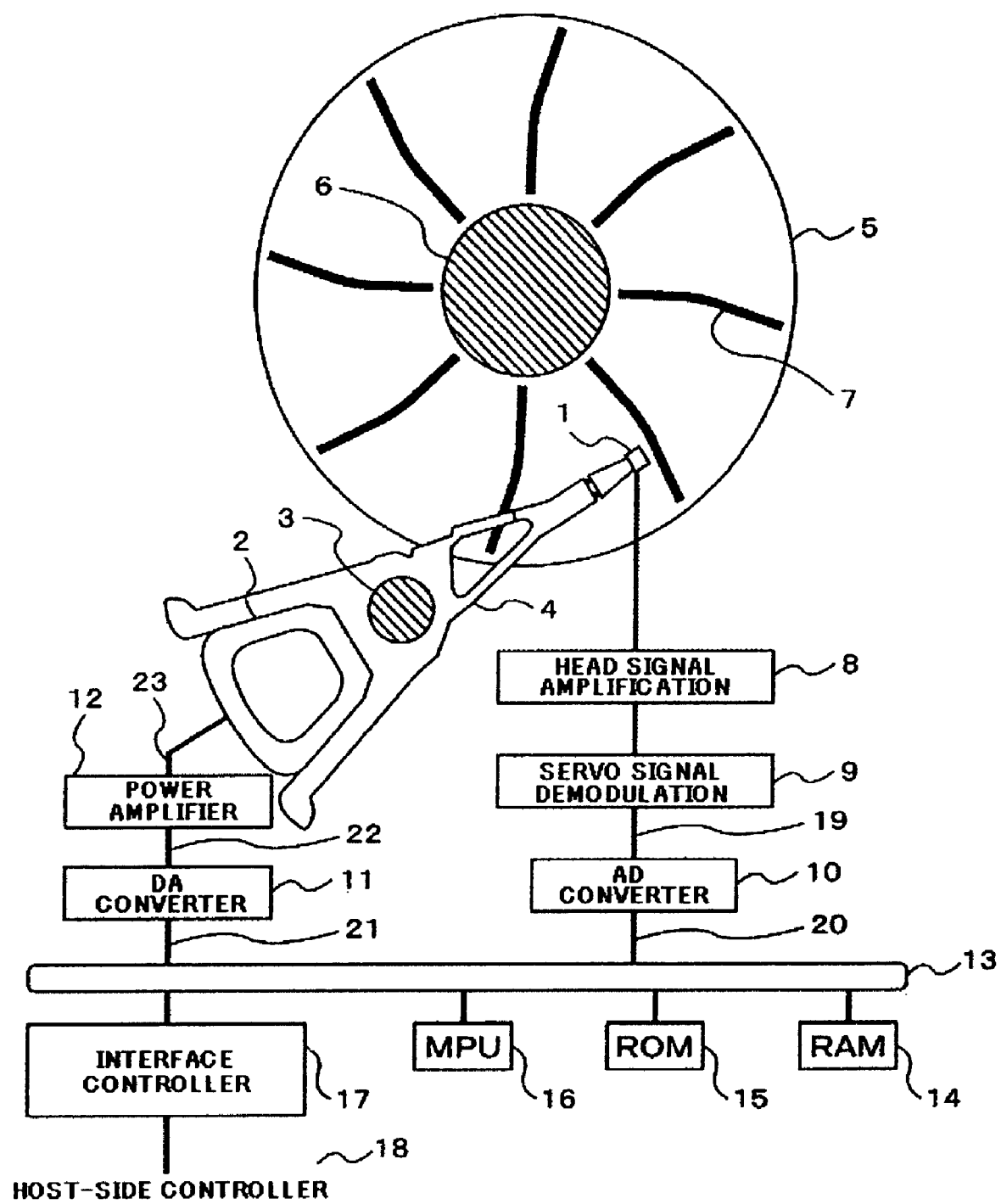
FIG. 1 is an exemplary diagram showing the basic configuration of a magnetic disk drive in accordance with an embodiment of the present invention.

Embodiments in accordance with the present invention relate to a magnetic disk drive and, more specifically, to positioning control of a magnetic head. Embodiments of the present invention provide, even when a specific vibration component has no phase correlation between before and after a seek operation of a magnetic head, a resonance filter that follows, at high speeds, the vibration at the frequency.

In order to achieve the above-described object, in accordance with an embodiment of the present invention, a frequency showing a periodic disturbance is selected as a target frequency Ft[Hz]. A resonance filter showing a peak gain at a frequency Ft is designed. For an input to the resonance filter, a time-variable gain is used that varies depending on the time lapsed after the completion of the seek operation. This time-variable gain takes a value larger than 1 when the resonance filter starts operating, and after the lapse of a fixed length of time, the value becomes 1 or smaller.

In a typical magnetic disk drive according to embodiments of the present invention, a controlled object includes an actuator, a magnetic head that performs a seek operation by being driven by the actuator, and a circuit that extracts a head position signal from information read by the magnetic head from an information recording medium. A control part is a portion that generates an operation signal to the actuator to derive 0 for an error signal being a difference between any provided target position and a head position indicated by the head position signal coming from the circuit. The control part includes: a phase compensator that stabilizes transfer characteristics of the controlled object with an input of the error signal; a resonance filter that is connected in series to the phase compensator via a time-variable gain adjuster; and an adder that combines an output of the resonance filter and an output of the phase compensator.

The control part may connect the time-variable gain adjuster and the resonance filter in parallel to the phase compensator.

A gain of the time-variable gain adjuster is 0 during the seek operation of the magnetic head, reaches a specified value larger than 1 when the seek operation is about to end, and shows a change by degrees to be 1 after remaining at the specified value for a predetermined length of time.

Alternatively, the gain of the time-variable gain adjuster may be 0 during the seek operation of the magnetic head, reach 1 when the seek operation is about to end, shows a change to be a specified value larger than 1 by degrees after a lapse of a predetermined length of time, and show a change by degrees to be 1 after remaining at the specified value for the predetermined length of time.

A vector locus of open loop transfer characteristics configured by the controlled object and the control part draws a right-handed circular locus in a direction to be away from coordinates (−1, 0) being an unstable point at a resonance frequency of the resonance filter.

According to embodiments of the present invention, even with any disturbance vibration, a magnetic head may trace on recording tracks with accuracy.

FIG. 1 is a diagram showing the basic configuration of a magnetic disk drive in a first embodiment of the present invention. A spindle motor 6 is fixed with a magnetic disk 5 being a recording medium, and is rotated with a fixed rotation speed. In the side direction of the magnetic disk 5 kept hold by the spindle motor 6, a pivot bearing 3 is so provided as to be parallel to a spindle motor axis. A carriage 4 is fixed to the pivot bearing 3 to be able to freely swing, and a magnetic head 1 is fixed at the tip of the carriage 4. The power to move (seek, following) the magnetic head 1 is generated by a voice coil motor (VCM) 2. The carriage 4 and the VCM 2 configure an actuator of the magnetic head 1.

The magnetic head 1 may acknowledge the current position by detecting a position signal recorded in a servo sector 7 on the magnetic disk. The position signal detected by the magnetic head 1 is amplified by a head signal amplifier 8, and is demodulated by a servo signal demodulator 9. The resulting demodulated servo signal 19 becomes a position signal 20 via an A/D converter 10, and is accepted by an MPU 16 via a bus 13. The position signal 20 derived as such is processed by the MPU 16, and a VCM control signal 21 is generated in the following manner.

The MPU 16 is provided with a ROM 15 and a RAM 14 via the bus 13. The ROM 15 stores therein various types of control programs for execution by the MPU 16, and also stores parameters needed for control application varying in type. The RAM 14 temporarily stores therein data for writing to the magnetic disk 5, and data for reading from the magnetic disk 5. The MPU 16 is connected with an interface controller 17 via the bus 13, and in response to a command coming from a host-side controller 18, issues a read/write access request for the MPU 16. When a command asking for data reading/writing is issued, the MPU 16 runs a control program recorded in the ROM 15 for head positioning, and from the position signal 20, generates the VCM control signal 21 being optimum for the current distance to the target position. Thus generated VCM control signal 21 becomes a power amplifier control signal 22 via a D/A converter 11 as shown in FIG. 1, and is converted into a current 21 via a power amplifier 12 for application to the VCM 2. The VCM 2 generates the driving force of the head actuator, and positions the magnetic head 1 at the target position (recording track).

Figure 2:
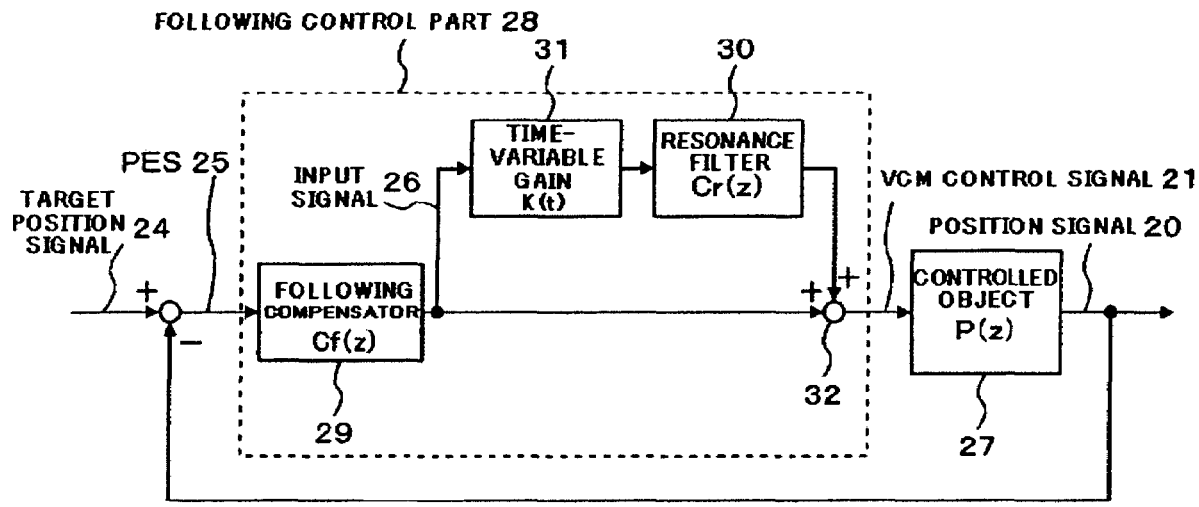
FIG. 2 is an exemplary block diagram showing an equation model of a positioning control system in accordance with an embodiment of the present invention.

By referring to FIG. 2, described next is a method of generating the VCM control signal 21 based on a difference between the current position of the magnetic heads 1 and the target position thereof. FIG. 2 is a block diagram showing an equation model of a positioning control system that is implemented by the MPU 16. For convenience of description, an equation model of a controlled object 27 is represented by P(z). In FIG. 1, the controlled object 27 covers from an input 21 of the D/A converter 11 to an output 20 of the A/D converter 10, and the input/output characteristics are represented by a transfer function P(z).

A following control part 28 is mainly configured by a following compensator 29 for implementing any desirable control capability (with transfer function of Cf(z)), a time-variable gain adjuster 31 showing a gain change by the time lapsed after the completion of seek operation (time-variable gain of K(t)), and a resonance filter 30 having the stable phase conditions (transfer function of Cr(z)). In the below, described is the signal flow in FIG. 2. An error signal (PES) 25 being a difference between the target position signal 24 and the position signal 20 is forwarded to the following compensator Cf(z) 29. An output of the following compensator Cf(z)

29 becomes an input signal 26 to the time-variable gain adjuster 31. The signal 26 being a result of multiplication by K(t) is forwarded to the resonance filter Cr(z) 30. The output of the resonance filter 30 and the output of the following compensator 29 are combined together in an adder 32, and the resulting sum becomes the VCM control signal 21 for input to the controlled object P(z) 27.

Described now is the equation model of FIG. 2. First of all, the controlled object P(z) 27 is presumed as being derived by applying discretization by zero order hold having a dead time to a mechanism system model P(s) in the following equation (1) representing a rigid mode of a continuous time system with an assumption as being a digital control system. In the equation 1, s denotes a Laplace transform element.

[Equation (1)]

$$P(s) = \frac{1}{s^2} \quad (1)$$

Figure 3:
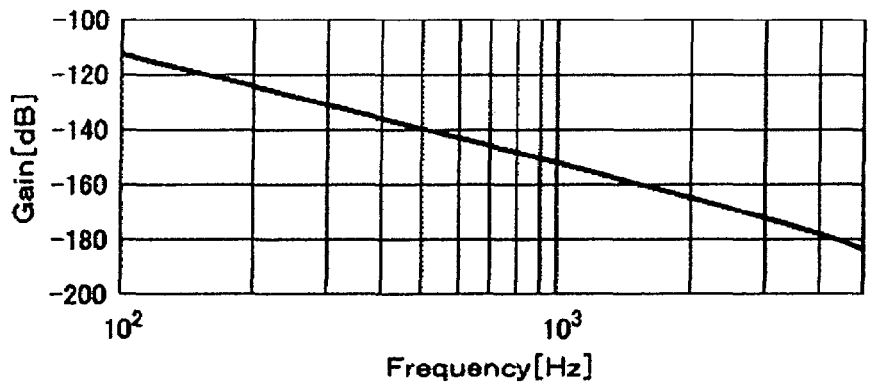
FIG. 3 is an exemplary diagram showing the frequency characteristics of a controlled object P(z) in accordance with an embodiment of the present invention.
Figure 3:
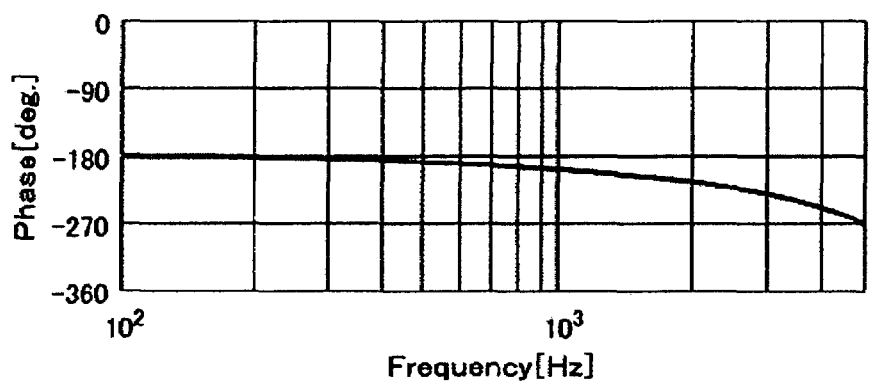

At that time, presumably, a sampling time is Ts, and the dead time is Tdl. FIG. 3 shows the frequency characteristics of a controlled object P(z) with the sampling time Ts of 100 μs, and the dead time Tdl of 10 μs.

Figure 4:
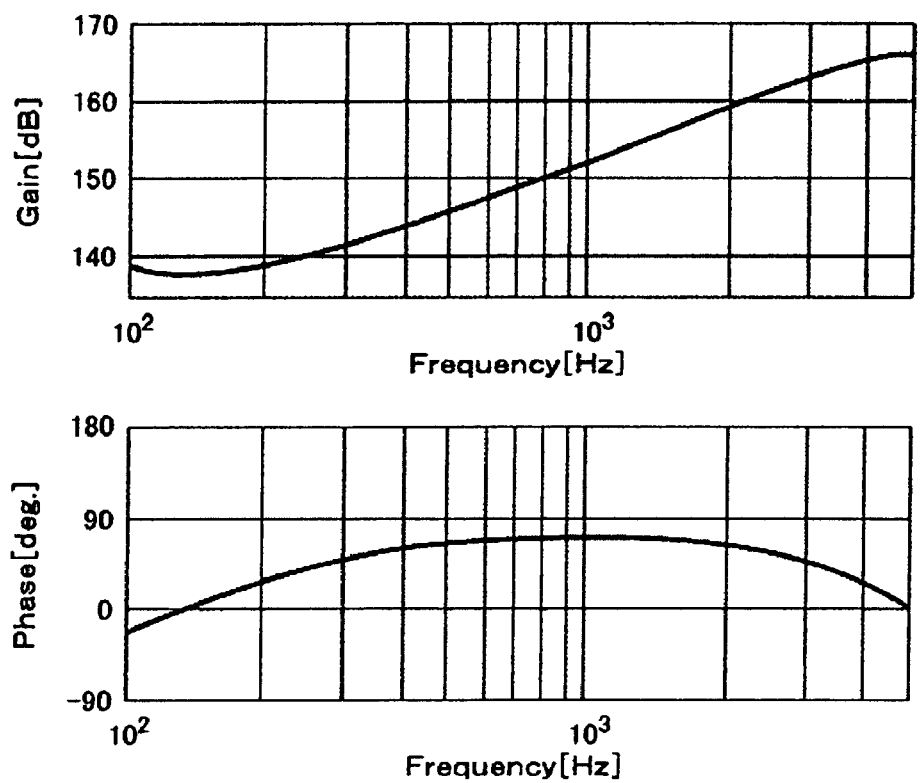
FIG. 4 is an exemplary diagram showing the frequency characteristics of the controlled object P(z) in accordance with an embodiment of the present invention.

The following compensator Cf(z) 29 is so designed as to have the following characteristics, for example. The first-order integral characteristics are provided in a low-frequency domain not to generate a stationary error even if any external force acts on the control system. For the aim of stabilizing the rigid mode, provided are phase-lead characteristics with which the phase lead is increased in a range of 700 Hz to 2 kHz. The proportional gain of the compensator is provided with the gain characteristics to derive 1100 Hz for a gain 0 db crossover frequency (frequency with input/output amplitude ratio of 1) with P(z)·Cf(z). FIG. 4 shows the frequency characteristics of the controlled object P(z) at this time.

Assumed here is that a target disturbance frequency is 420 Hz. The resonance filter Cr(z) 30 is so designed as to have a resonance point at 420 Hz, and a vector locus with a case of K(t)=1 in the open loop characteristics Op(z) in the following equation (2) draws a circular locus to be away from an unstable point (−1, 0) in the vicinity of a resonance frequency (420 Hz) of the resonance filter.

[Equation (2)]

$$Op(z)=P(z)\cdot Cf(z)\cdot(1+K(t)\cdot Cr(z)) \quad (2)$$

Figure 5:
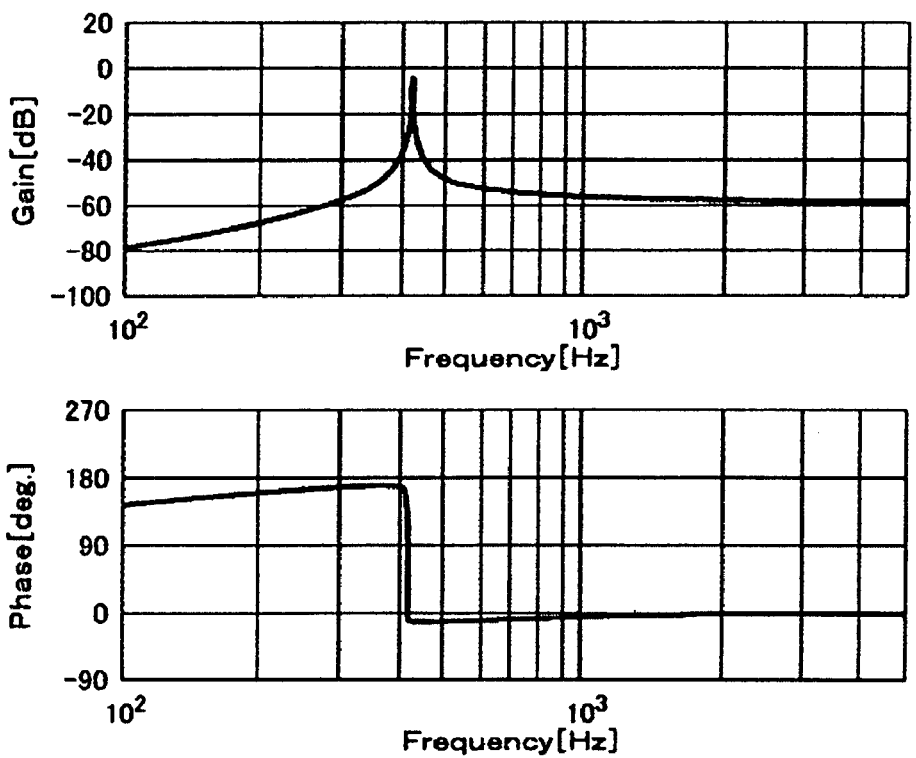
FIG. 5 is an exemplary diagram showing the frequency characteristics of a resonance filter Cr(z) in accordance with an embodiment of the present invention.

To be specific, the phase of the resonance filter Cr(Z) 30 may satisfy the following equation (3) with a natural frequency ω. FIG. 5 shows the frequency characteristics of the resonance filter Cr(z) 30 at this time.

[Equation (3)]

$$\angle Cr(e^{j\omega Ts}) = \arctan\left(\frac{\operatorname{Im}[P(e^{j\omega Ts})\cdot Cf(e^{j\omega Ts})]}{\operatorname{Re}[P(e^{j\omega Ts})\cdot Cf(e^{j\omega Ts})]+1}\right) - \angle[P(e^{j\omega Ts})Cf(e^{j\omega Ts})] \quad (3)$$

Figure 6:
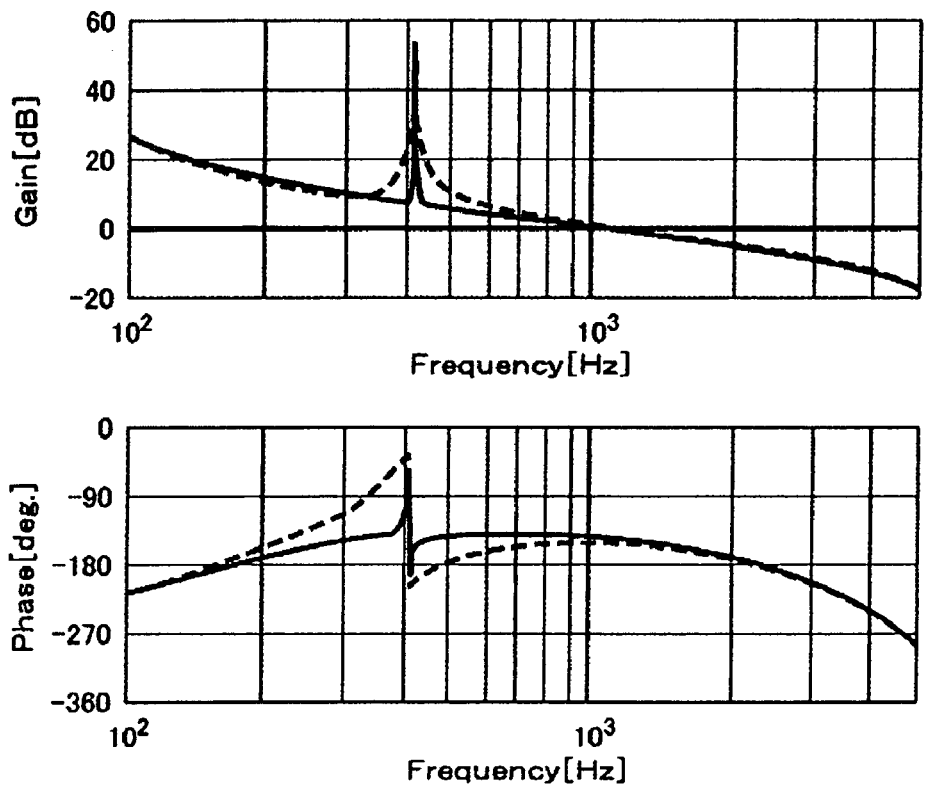
FIG. 6 is an exemplary diagram showing the frequency characteristics of open loop transfer characteristics in accordance with an embodiment of the present invention.

With a larger input signal to the resonance filter 30, the resonance filter 30 converges at higher speed but the stable margin of the control system is reduced. Accordingly, the time-variable gain K(t) is required to, when being maximum in value, make the control system remain sufficiently stable. In consideration thereof, in this embodiment, the maximum value of K(t) is set to 20. In the case with K(t)=1, the frequency characteristics of the open loop transfer characteristics are indicated by the solid line of FIG. 6, the vector locus of the open loop transfer characteristics is indicated by the solid line of FIG. 7, and the frequency gain characteristics of a sensitivity function are indicated by the solid line of FIG. 8. In the case with K(t)=20, the frequency characteristics of the open loop transfer characteristics are indicated by the broken line of FIG. 6, the vector locus of the open loop transfer characteristics is indicated by the broken line of FIG. 7, and the frequency gain characteristics of the sensitivity function are indicated by the broken line of FIG. 8.

Figure 7:
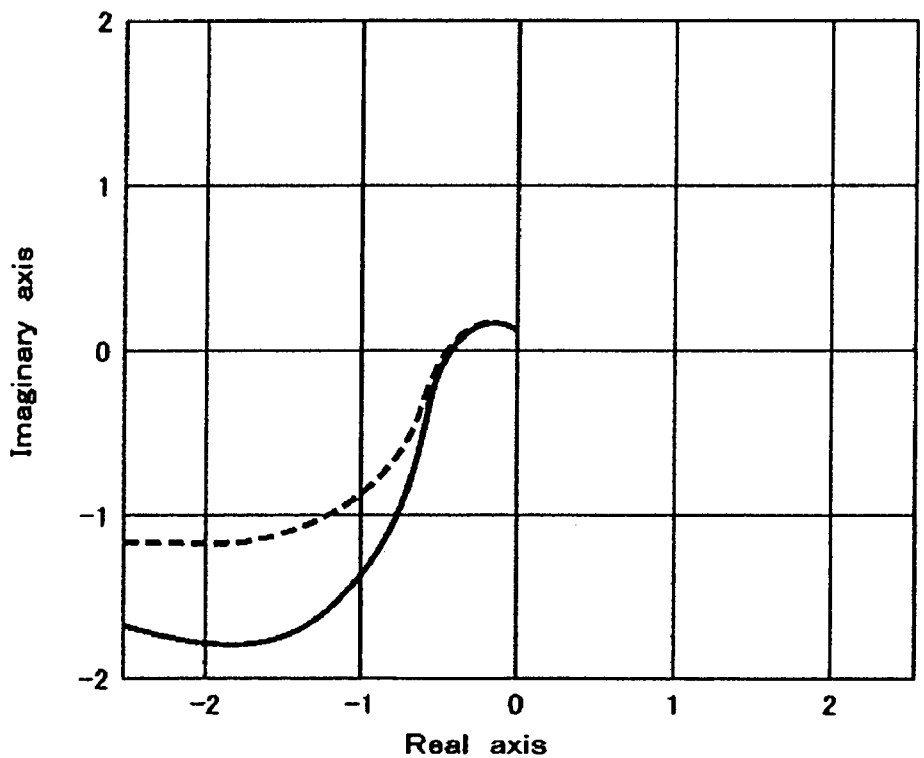
FIG. 7 is an exemplary diagram showing a vector locus of the open loop characteristics in accordance with an embodiment of the present invention.
Figure 8:
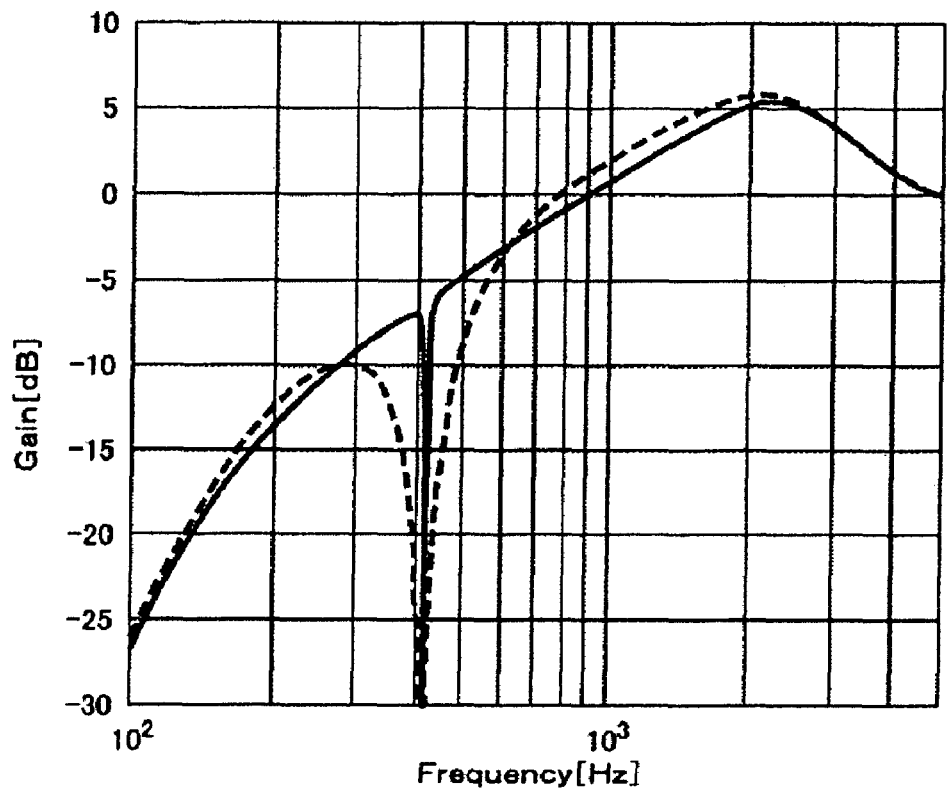
FIG. 8 is an exemplary diagram showing frequency gain characteristics of a sensitivity function in accordance with an embodiment of the present invention.

By referring to FIGS. 7 and 8, it is known that, when the time-variable gain K(t) is increased, a phase margin is reduced and the gain of a sensitivity function is reduced from 600 Hz to 3 kHz. Therefore, if such a large-gain resonance filter is used as a fixed value, the position accuracy other than at the target frequency of the resonance filter is reduced to a further degree. It is thus considered effective to vary an input gain of the resonance filter to minimize the time taken for the sensitivity function to be reduced. The time-variable gain K(t) takes a maximum gain in value when learning is started, and with after sufficient convergence, the gain is brought closer to 1 by degrees. This prevents occurrence of a transient response even if K(t) shows a change. In consideration thereof, K(t) is provided as a variable value as FIG. 10. Herein, at t=0, the resonance filter 30 starts its operation. After the resonance filter is operated, K(t) will be 20 for the duration of 2.5 ms. Thereafter, K(t) will shows a change to be closer to 1 by degrees.

Figure 9:
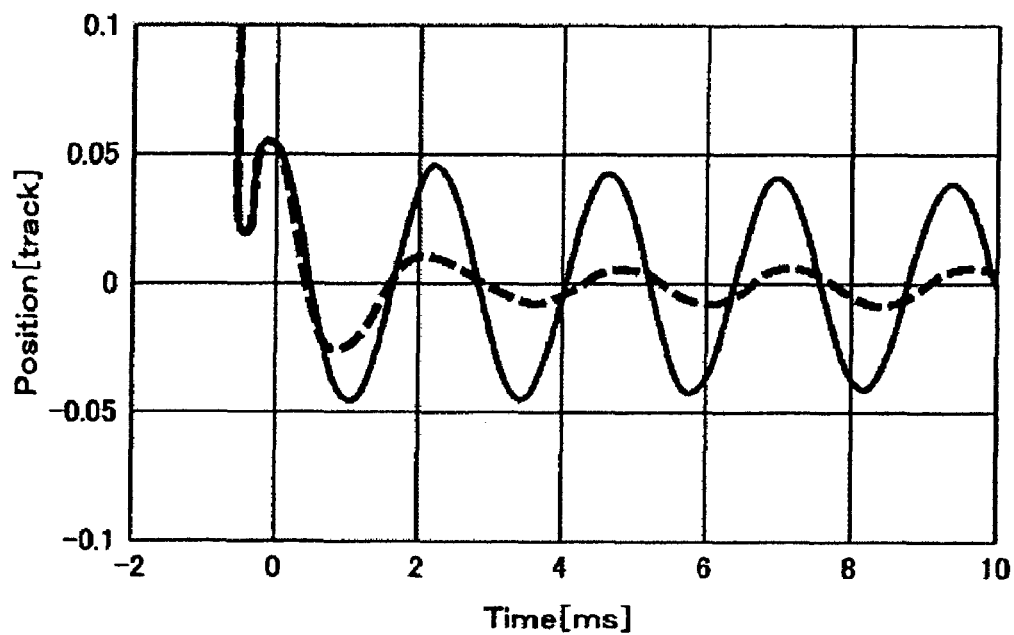
FIG. 9 is an exemplary diagram showing a time response of a head position in the vicinity of a target value after the completion of a seek operation in accordance with an embodiment of the present invention.
Figure 10:
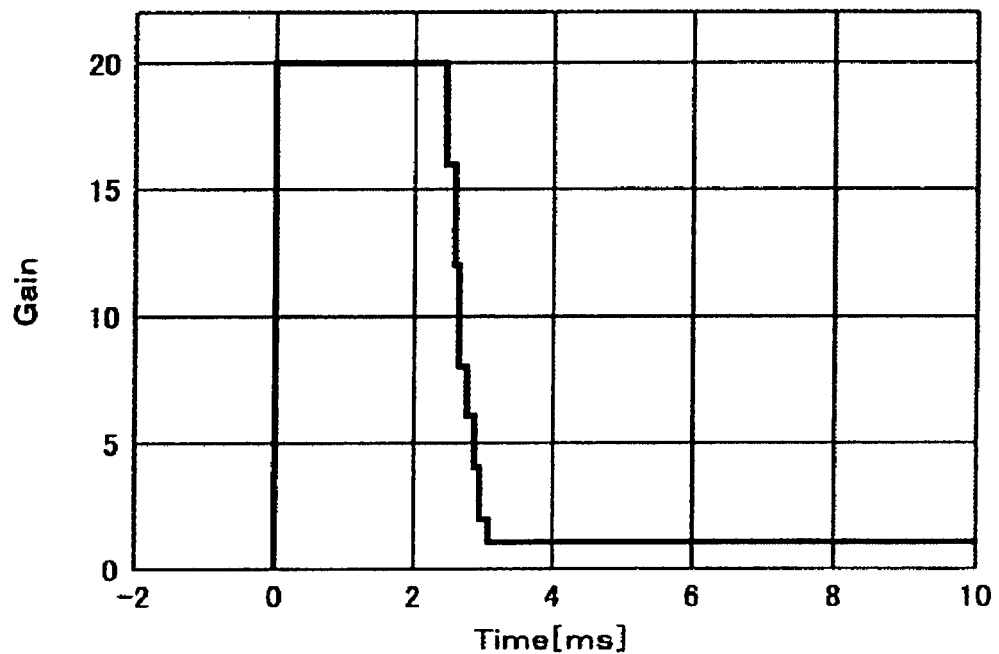
FIG. 10 is an exemplary diagram showing time responses of a time-variable gain K(t) in accordance with an embodiment of the present invention.

For the aim of confirming the effects of this embodiment, a seek operation is simulated by applying, to the position signal 20, a sine wave disturbance of the size 0.5 and the frequency 420 Hz. The resonance filter 30 is presumed to start its operation at a 5th sample after reaching in the vicinity of a target track, and the resonance filter 30 is presumed to start its operation at t=0. Immediately before the operation starts, the state variables of the resonance filter 30 are all set to 0. Where this particular embodiment is not applied, the solid line of FIG. 9 indicates the response at the head position in the vicinity of a target value with K(t) fixed to 1. This drawing tells that, with K(t) fixed to 1, the convergence of the disturbance suppression function is not enough. For a case of this embodiment, the broken line of FIG. 9 indicates the response at the head position in the vicinity of a target value when K(t) of FIG. 10 is used. This drawing tells that, by making K(t) variable, the disturbance vibration is converging at high speed.

As described in the foregoing, according to this embodiment, at the time when the resonance filter starts its operation, the time-variable gain K(t) takes a maximum gain, and after the lapse of a fixed length of time, the gain is brought closer to 1 by degrees. This accordingly increases the speed for the resonance filter to follow the disturbance vibration, and the sensitivity function may be prevented from being reduced. This thus enables the magnetic head to trace on recording tracks with accuracy.

Figure 11:
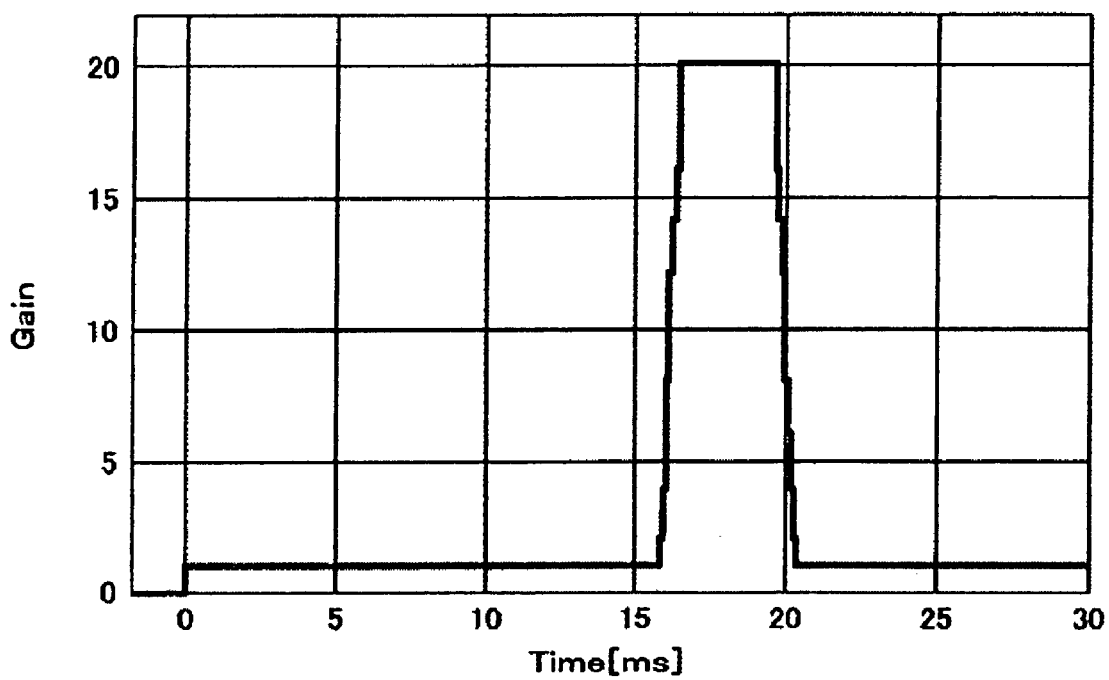
FIG. 11 is an exemplary diagram showing the time responses of a time-variable gain K(t) in accordance with another embodiment of the present invention.
Figure 12:
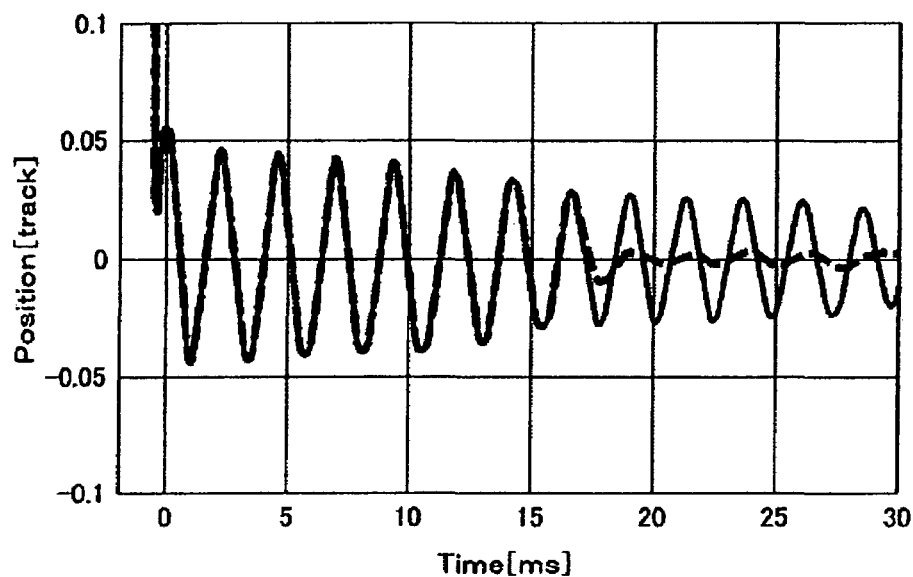
FIG. 12 is an exemplary diagram showing a time response of a head position in the vicinity of a target value after the completion of a seek operation in accordance with an embodiment of the present invention.

Described next is a method of generating the VCM control signal 21 in accordance with a second embodiment of the present invention. The basic configuration of the magnetic disk drive is the same as that of the first embodiment. Any component structure similar to that of the first embodiment is provided with the same reference numeral, and not described again. In the first embodiment, the time-variable gain K(t) is so designed as to take a maximum gain when the resonance filter 30 starts its operation. When the influence of a transient response of the control system is dominant in vibration components to be generated at the time of settling, there may be a possibility of not being able to improve the vibration characteristics at the time of settling with the method of the first embodiment. In consideration thereof, in the second embodiment, the time-variable gain K(t) is so set as to take a maximum value in a rotation-wait time range until a target sector comes after the seek operation. FIG. 11 shows a value of the time-variable gain K(t) in the second embodiment. Here, the target sector is presumed to be reached at t=26 ms. Presumably, K(t) takes a value of 1 when the learning starts, i.e., t=0, and reaches the maximum value by showing a change by degrees from about 10 ms (about 16 ms) before reaching the target sector. After the maximum value is retained for about 3 ms, the value is put back to 1 after showing a change by degrees. The broken line of FIG. 12 shows the response at the head position in the vicinity of a target value when the time-variable gain K(t) of FIG. 11 is used. This drawing tells that, by using the time-variable gain K(t), the target disturbance may be sufficiently suppressed before a target sector is being reached.

Figure 13:
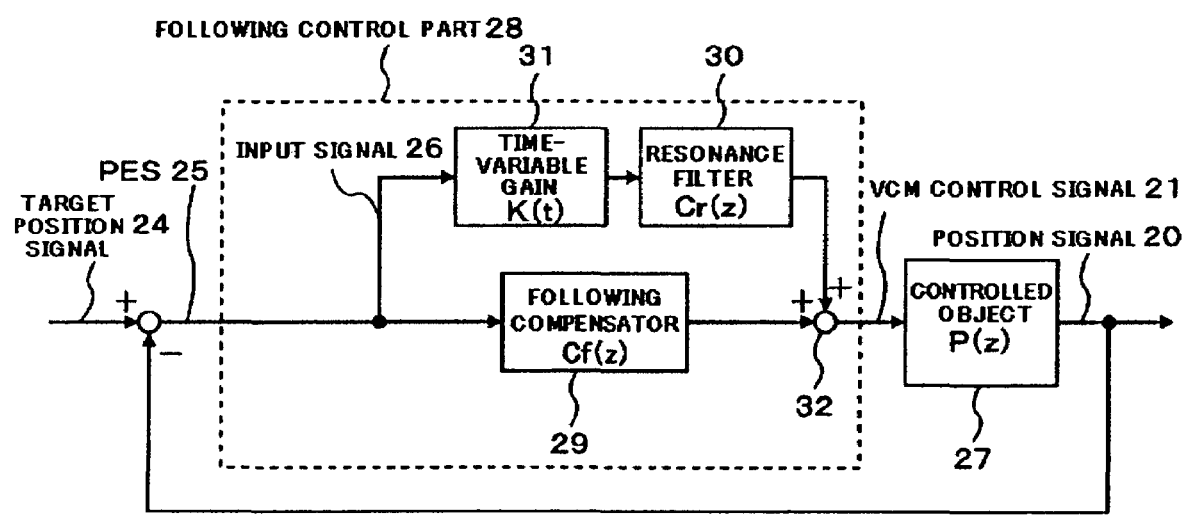
FIG. 13 is an exemplary block diagram showing an equation model of a positioning control system in still another embodiment of the present invention.

FIG. 13 shows a block diagram of an equation model of a positioning control system in a third embodiment. Only any respect different from the first embodiment will be described, and any similar component structure is provided with the same reference numeral, and not described again. In the first embodiment, the time-variable gain adjuster 31 and the resonance filter Cr(z) 30 are connected in series to the following compensator Cf(z) 29. Alternatively, due to some constraints applied to the drive, there may be a case that the resonance filter Cr(z) 30 is to be connected to the following compensator 29 in parallel. In consideration thereof, in the third embodiment, exemplified is a case where the time-variable gain adjuster 31 and the resonance filter Cr(z) 30 are coupled in parallel to the following compensator Cf(z) 29. In the open loop transfer characteristics Op(z) in the following equation (4), the resonance filter Cr(z) 30 is so designed that, if with K(t)=1, a vector locus draws a circular locus to be away from an unstable point (−1, 0) with a resonance frequency of the resonance filter.

[Equation (4)]

$$Op(z)=P(z)\cdot(Cf(z)+K(t)\cdot Cr(z)) \quad (4)$$

To be specific, the phase of the resonance filter Cr(z) 30 may satisfy the following equation (5) with a natural frequency ω.

[Equation (5)]

$$\angle Cr(e^{j\omega Ts}) = \arctan\left(\frac{\text{Im}[P(e^{j\omega Ts})\cdot Cf(e^{j\omega Ts})]}{\text{Re}[P(e^{j\omega Ts})\cdot Cf(e^{j\omega Ts})]+1}\right) - \angle P(e^{j\omega Ts}) \quad (5)$$

As described in the foregoing, in accordance with embodiments of the present invention, even when a specific vibration component has no phase correlation between before and after a seek operation of a magnetic head, the resonance filter may follow, at high speeds, the vibration at the frequency. This thus enables to suppress the disturbance vibration observed at a specific frequency may be suppressed with high speed in the positioning control system of the magnetic head drive so that the magnetic head becomes able to trace on recording tracks with accuracy.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A disk drive, comprising:
a controlled object including;
an actuator,
a head for performing a seek operation by being driven by the actuator, and
a circuit for extracting a head position signal from information read by the head from a recording medium, and
a control part including;
a signal generator for generating an operation signal to the actuator to make an error signal made by a difference between a target position and a head position indicated by the head position signal coming from the circuit as 0,
a phase compensator for stabilizing transfer characteristics of the controlled object by inputting the error signal,
a resonance filter, configured as a band-pass filter, connected in series to the phase compensator via a time-variable gain adjuster, and
an adder for adding an output of the resonance filter and an output of the phase compensator, wherein
a gain of the time-variable gain adjuster is 0 during the seek operation of the head, becomes a specified value larger than 1 when the seek operation is about to end, and becomes 1 by gradation after remaining at the specified value for a predetermined length of time.

2. The disk drive according to claim 1, characterized in that a gain of the time-variable gain adjuster is 0 during the seek operation of the head, becomes 1 when the seek operation is about to end, becomes a specified value larger than 1 after a predetermined length of time by gradation, and becomes a 1 after remaining at the specified value for the predetermined length of time by gradation.

3. The disk drive according to claim 1, wherein a vector locus of open loop transfer characteristics configured by the controlled object and the control part draws a right-handed circular locus in a direction to be away from coordinates (−1, 0) where is an unstable point at a resonance frequency of the resonance filter.

4. The disk drive according to claim 1, wherein the resonance filter has a peak gain in a frequency including a periodic disturbance.

5. A disk drive comprising:
a controlled object including;
an actuator,
a head for performing a seek operation by being driven by the actuator, and
a circuit for extracting a head position signal from information read by the head from an recording medium, and;
a control part including;
a signal generator for generating an operation signal to the actuator for making an error signal being a difference between a target position and a head position indicated by the head position signal coming from the circuit as 0,
a phase compensator for stabilizing transfer characteristics of the controlled object with an input of the error signal,
a time-variable gain adjuster being input the error signal,
a resonance filter, configured as a band-pass filter, being input an output of the time-variable gain adjuster; and
an adder for combining an output of the resonance filter and an output of the phase compensator, wherein
a gain of the time-variable gain adjuster is 0 during the seek operation of the head, becomes a specified value larger than 1 when the seek operation is about to end, and becomes by gradation after remaining at the specified value for a predetermined length of time.

6. The disk drive according to claim 5, wherein
a gain of the time-variable gain adjuster is 0 during the seek operation of the head, becomes 1 when the seek operation is about to end, becomes by gradation to be a specified value larger than 1 after a predetermined length of time, and becomes by gradation to be 1 after remaining at the specified value for the predetermined length of time.

7. The disk drive according to claim 5, wherein
a vector locus of open loop transfer characteristics configured by the controlled object and the control part draws a right-handed circular locus in a direction to be away from coordinates (−1, 0) where is an unstable point at a resonance frequency of the resonance filter.

8. The disk drive according to claim 5, wherein
the resonance filter has a peak gain in a frequency including a periodic disturbance.

9. A disk drive, comprising:
a controlled object and a control part; wherein
the controlled object comprising an actuator, a head for performing a seek operation by being driven by the actuator, and a circuit for extracting a head position signal from information read by the head from a recording medium, and wherein
the control part comprising a signal generator for generating an operation signal to the actuator to make an error signal made by a difference between a target position and a head position indicated by the head position signal coming from the circuit as 0, a phase compensator for stabilizing transfer characteristics of the controlled object by inputting the error signal, a resonance filter, configured as a band-pass filter, connected in series to the phase compensator via a time-variable gain adjuster, and an adder for adding an output of the resonance filter and an output of the phase compensator, wherein
a gain of the time-variable gain adjuster is 0 during the seek operation of the head, becomes a specified value larger than 1 when the seek operation is about to end, and becomes 1 by gradation after remaining at the specified value for a predetermined length of time.

10. The disk drive according to claim 9, characterized in that
a gain of the time-variable gain adjuster is 0 during the seek operation of the head, becomes 1 when the seek operation is about to end, becomes a specified value larger than 1 after a predetermined length of time by gradation, and becomes a 1 after remaining at the specified value for the predetermined length of time by gradation.

11. The disk drive according to claim 9, wherein
a vector locus of open loop transfer characteristics configured by the controlled object and the control part draws a right-handed circular locus in a direction to be away from coordinates (−1, 0) where is an unstable point at a resonance frequency of the resonance filter.

12. The disk drive according to claim 9, wherein
the resonance filter has a peak gain in a frequency including a periodic disturbance.

* * * * *